(12) United States Patent
Phillips et al.

(10) Patent No.: US 7,299,055 B1
(45) Date of Patent: Nov. 20, 2007

(54) GEOGRAPHIC REPRESENTATION OF END USER FIXED WIRELESS COMMUNICATION DEVICE

(75) Inventors: Bob Phillips, Stilwell, KS (US); James Wade Landon, Overland Park, KS (US); John N. Holmberg, Overland Park, KS (US); Feng Zhang, Lee's Summit, MO (US); David Anthony Reisinger, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 756 days.

(21) Appl. No.: 10/280,193

(22) Filed: Oct. 25, 2002

(51) Int. Cl.
*H04Q 7/20* (2006.01)

(52) U.S. Cl. .............................. 455/456.1; 455/404.2; 455/457; 455/67.11

(58) Field of Classification Search ............. 455/456.1, 455/456.6, 428, 445, 404.2, 446, 422.1, 423, 455/424, 425, 67.11, 67.14, 457
See application file for complete search history.

(56) References Cited

U.S. PATENT DOCUMENTS

| | | | | |
|---|---|---|---|---|
| 5,095,500 | A * | 3/1992 | Tayloe et al. ............. | 379/32.01 |
| 6,266,514 | B1 * | 7/2001 | O'Donnell ................ | 455/67.13 |
| 6,490,256 | B1 * | 12/2002 | Jones et al. ................. | 370/277 |
| 6,782,093 | B2 * | 8/2004 | Uckun .................... | 379/266.06 |
| 6,795,400 | B1 * | 9/2004 | Schick ........................ | 370/236 |
| 6,836,539 | B2 * | 12/2004 | Katou et al. ............ | 379/106.01 |
| 6,970,702 | B1 * | 11/2005 | Martin ........................ | 455/424 |
| 7,050,808 | B2 * | 5/2006 | Janusz et al. ................ | 455/445 |
| 7,068,299 | B2 * | 6/2006 | Lemieux et al. .......... | 348/14.03 |
| 2001/0039489 | A1 * | 11/2001 | Ford et al. ...................... | 704/1 |
| 2002/0151270 | A1 * | 10/2002 | Johnston .................... | 455/3.05 |
| 2002/0183927 | A1 * | 12/2002 | Odamura ..................... | 701/213 |
| 2003/0020954 | A1 * | 1/2003 | Udom et al. ................ | 358/1.18 |
| 2003/0072485 | A1 * | 4/2003 | Guerin et al. ................ | 382/166 |
| 2003/0083073 | A1 * | 5/2003 | Cossins et al. ............. | 455/446 |
| 2003/0176161 | A1 * | 9/2003 | Dale et al. .................. | 455/3.01 |
| 2004/0028017 | A1 * | 2/2004 | Whitehill et al. ........... | 370/338 |
| 2004/0082341 | A1 * | 4/2004 | Stanforth .................. | 455/456.1 |
| 2005/0105491 | A1 * | 5/2005 | Chaskar et al. ............. | 370/331 |

OTHER PUBLICATIONS

Dawson, Fred, "Broadband Wireless for Biz: Rumblings," XCHANGE, www.xchangemag.com, Oct. 2000, pp. 52-68.

* cited by examiner

*Primary Examiner*—George Eng
*Assistant Examiner*—Huy Phan

(57) ABSTRACT

Methods, products, and systems graphically represent a plurality of end user fixed wireless communication devices. A graphics system receives messages from the end user fixed wireless communication devices wherein the messages indicate operational data. The graphics system then processes the operational data to determine performances for the end user fixed wireless communication devices and diagnose provisionings of the end user fixed wireless communication devices. The graphics system determines geographic locations of the end user fixed wireless communication devices. The graphics system then generates a geographic map indicating the geographic locations and the performances of the end user fixed wireless communication devices.

42 Claims, 14 Drawing Sheets

| STATE | MARKET | HEADEND | INTEGER | MONTH | DAY | YEAR | HOSTNAME | AVERAGE POWER | NUMBER OF CALIBRATION |
|---|---|---|---|---|---|---|---|---|---|
| | | | | | | | | | |

FIG. 7
WBR POWER EXTRACT RECORD

| HOST ID | HOST NAME | IP | MARKET ID | SUBDOMAIN ID |
|---|---|---|---|---|
| | | | | |

FIG. 8
HOST_SYN

| CUSTOMER ID | UUID | CCMD TYPE ID | RETURN DEVICE ID | DDFG ID | HOST ID | IP | UDFG ID | DHCP | ARP | VOL | PFX |
|---|---|---|---|---|---|---|---|---|---|---|---|
| | | | | | | | | | | | |

FIG. 9
CUST_HARDWARE_SYN

| CUSTOMER ID | SLATITUDE | SLONGITUDE | SSECTOR | SMILES | CLATITUDE | CLONGITUDE | CSECTOR | CMILES |
|---|---|---|---|---|---|---|---|---|
| | | | | | | | | |

FIG. 10
REP_MASTER_MERLIN_MAPINFO

| | |
|---|---|
| CUSTOMER ID | |
| ADDRESS1 | |
| ADDRESS2 | |
| CITY | |
| COMPANY NAME | |
| DIVISION ID | |
| EXTENSION | |
| FIRST NAME | |
| FRANCHISE ID | |
| INSTALL DAY | |
| INSTALL MONTH | |
| INSTALL YEAR | |
| LINE1 | |
| LINE2 | |
| LAST NAME | |
| MARKET ID | |
| NPA1 | |
| NPA2 | |
| NXX1 | |
| NXX2 | |
| PAGER | |
| PROVISION DATE | |
| STATE | |
| STATUS ID | |
| UPDATED BY | |
| UPDATED LAST | |
| ZIP CODE | |
| INSTALL TIME | |
| NUM PCS | |
| NEW | |
| CV | |
| VC | |

FIG. 11
CUST_SYN

| | |
|---|---|
| HOST NAME | |
| SPATIAL LOCATION | |
| SLATITUDE | |
| SLONGITUDE | |
| CLATITUDE | |
| CLONGITUDE | |
| ADDRESS1 | |
| CITY | |
| STATE | |
| ZIP CODE | |
| DATE | |
| WBRAVG | |
| WBRMAX | |
| WBRMIN | |
| NBRSCCSSFL | |
| IP | |
| MARKET ID | |
| CUSTOMER ID | |
| UUID | |
| UDFG ID | |
| HOST ID | |
| IP | |
| SSECTOR | |
| CSECTOR | |
| COMPANY NAME | |
| FNAME | |
| INSTALL_DAY | |
| INSTALL_MONTH | |
| INSTALL_YEAR | |
| LNAME | |
| PROVISION_DATE | |
| GISSECTOR | |
| GEOSECTOR | |
| MAXMINDIF | |
| SECTMATCH | |

FIG. 12
Oracle WBR Table View

| DESCRIPTION | COL_NAME | ROW_NAME | MARKET | GRID_CELL | PWRAVERAGE | WBRCOUNT |
|---|---|---|---|---|---|---|
| | | | | | | |

FIG. 13
Oracle Grid Table View

| ID | MARKET ID | UDFG ID | SERVICE AREA | UDFG NAME CMGR | GIS SITE | GIS SECTOR | GIS SITE LONG | TYPE | STATUS |
|---|---|---|---|---|---|---|---|---|---|
| | | | | | | | | | |
| | | | | | | | | | |

FIG. 14
Network Sector Names Cross Reference Table

GEOGRAPHIC REPRESENTATION OF END USER FIXED WIRELESS COMMUNICATION DEVICE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to methods, products, and systems for a geographic representation of end user fixed wireless communication devices.

2. Description of the Prior Art

People and businesses are demanding higher bandwidths from their communication providers. Consequently, the communication providers are looking for ways to increase the bandwidth of their systems using broadband technologies. Broadband technologies are generally referred to as systems that deliver a bandwidth at or above 64 kbps. Broadband technologies can communicate over downstream channels and upstream channels. The customer receives data from another device or system over the downstream channels. The customer transmits data to another device or system over the upstream channels.

Broadband Wireline Systems

One example of a broadband technology is Digital Subscriber Line (DSL) service. DSL service can carry both voice signals and data signals at the same time in both directions. DSL service also can carry call information and customer data. DSL service is typically comprised of twisted-pair wires that connect a customer to a central office. The central office comprises a Digital Subscriber Line Access Multiplexer (DSLAM) that provides the DSL service to the customer. Unfortunately, the speed of DSL service is limited by the distance between the customer and the DSLAM. Customers located too far from the DSLAM may not be able to receive high-speed service. Also, there may not be enough customers within a particular area to make it economical to install a DSLAM. The quality of DSL service is also limited by the quality of the copper wire that connects the customer to the DSLAM. Furthermore, DSL service does not work over Digital Loop Carrier (DLC) lines.

Another broadband technology is cable modem service. The cable modem communicates with a device or system over a coaxial cable. The coaxial cable is typically the same coaxial cable used to receive cable television. The cable modem service can be one-way or two-way. In a two-way system, the coaxial cable carries both the upstream channels and the downstream channels. In a one-way system, the cable modem receives data on the downstream channels over the coaxial cable and transmits data on the upstream channels over a phone line. Unfortunately, the cable modem uses up valuable bandwidth on the phone line in the one-way system. Also, the upstream bandwidth is small over a phone line.

Broadband Wireless Systems

Another broadband technology is broadband wireless service. Customers that subscribe to broadband wireless service communicate with a head end. In a one-way wireless system, a transmitter antenna for the head end broadcasts wireless signals to the customer on the downstream channels. The transmitter antenna is a satellite antenna or a land-based antenna. The customer transmits data to the head end over another medium, such as a phone line or a cable modem, on the upstream channels. One example of a one-way wireless system is a Digital Satellite System (DSS) from DIRECTV.

A specific type of broadband wireless system communicates over Multichannel Multipoint Distribution Service (MMDS) frequencies and Multipoint Distribution Service (MDS) frequencies. The MMDS frequencies range from 2500 MHz to 2686 MHz. The MDS frequencies range from 2150 MHz to 2162 MHz. In a typical MMDS system, the bandwidth of the upstream channels is about 6 MHz. The upstream bandwidth is divided into subchannels. Each subchannel has a bandwidth of 200 kHz. In other examples, each subchannel has a bandwidth of 166 KHz.

A head end manages the upstream and downstream channels with the customer. The head end also interfaces the customer with communication networks such as the Internet. The head end includes a base antenna comprised of a transmitter antenna and one or more receiver antennas. MMDS requires a line of sight between devices that are communicating. Therefore, the antennas are placed on a high building or a mountain to establish lines of sight with the customers.

The transmitter antenna is omni-directional and broadcasts data from the head end to the customers on the downstream channels. In a two-way wireless system, the receiver antennas are positioned to receive MMDS signals transmitted from customers to the head end on the upstream channels. Each receiver antenna is positioned to receive MMDS signals from customers located within a certain area. The areas formed by the antennas are referred to as sectors. The sectors have designated frequency ranges or designated channels.

The head end is comprised of an upstream manager and a downstream manager that control transmissions on the upstream channels and the downstream channels, respectively. As stated above, the upstream channels and the downstream channels are divided into subchannels. One upstream subchannel is a contention channel reserved for signaling, while the remaining subchannels are bearer channels.

In the broadband wireless system, a wireless broadband router is located at a customer premises. The wireless broadband router communicates with the upstream manager and the downstream manager to exchange data. The upstream manager generally operates the channels and/or subchannels in four states: idle, contention, polling, and dedicated. In the idle state, the channels are idle. In the contention state, the upstream manager generates and transmits control signals over one or more subchannels.

For the polling and dedicated states, the upstream manager polls numerous wireless broadband routers to allocate use of the subchannels. Polling is a round robin process to determine which wireless broadband router has access to a subchannel. The upstream manager maintains a queue of the active wireless broadband routers to determine which wireless broadband router is next to transmit over a subchannel for a period of time. The upstream manager keeps an inventory of open subchannels and waiting wireless broadband routers in the queue.

One problem with this fixed wireless MMDS broadband system relates to the central tower with multiple antennas providing coverage to different geographic areas. A wireless broadband router may be misprovisioned to the wrong antenna, which creates interference. Thus, the geographic position of the wireless broadband router is a critical component to understand for performance management.

Various systems within the broadband wireless system collect and store information indicating the performance of the broadband wireless system. Some systems' sole purpose is to collect and store this type of performance information. A performance management system then retrieves some of this performance information from the various systems within the broadband wireless system. Based on user's requests, the performance management system then graphically displays the requested performance information. For example, the performance management system displays a table of wireless broadband routers in a sector and the respective download/upload rate and download/upload number of bytes. Another example is the display of the wireless broadband routers that use the most wireless capacity. Also, the name and address related to any wireless broadband router may be displayed. However, the performance information and customer information is only displayed in a text and table format. An overall view of a sector or adjacent sectors is shown only through a table format.

Prior mapping software solutions such as Autodesk MapGuide provide interactive geographic maps for on-line map presentations with flexible viewing options. These geographic maps have the ability to be re-sized and re-centered. These prior mapping software solutions are used in developing applications that require presentation of geographic maps. Some of the prior mapping software solutions use a specialized database for location information. One such database is called a Spatial database from Oracle. This database provides data management for location information such as road networks and wireless service boundaries. This database also assists any mapping and spatial analysis. Other software programs convert addresses to coordinates such as latitude and longitude, which can then be used in the geographic maps.

SUMMARY OF THE INVENTION

The inventions solve the above problems by graphically representing a plurality of end user fixed wireless communication devices. A graphics system receives messages from the end user fixed wireless communication devices wherein the messages indicate operational data. The graphics system then processes the operational data to determine performances for the end user fixed wireless communication devices and diagnose provisionings of the end user fixed wireless communication devices. The graphics system determines geographic locations of the end user fixed wireless communication devices. The graphics system then generates a geographic map indicating the geographic locations and the performances of the end user fixed wireless communication devices.

In some embodiments, the sizes of the end user fixed wireless communication devices on the geographic map indicate the performances of the end user fixed wireless communication devices. In some embodiments, the shapes of the end user fixed wireless communication devices on the geographic map indicate the performances of the end user fixed wireless communication devices. In some embodiments, the colors of the end user fixed wireless communication devices on the geographic map indicate the performances of the end user fixed wireless communication devices. In some embodiments, the graphics system receives and processes a request for selecting one of the end user fixed wireless communication devices. The graphics system then displays the performances of the selected one of the end user fixed wireless communication devices.

The graphics system advantageously provides a visual, geographic representation of end user fixed wireless communication devices, which is easy to understand. Thus, network monitoring and management is improved by detecting and identifying network problems quicker. Also, the graphic system also improves the monitoring of network performance.

BRIEF DESCRIPTION OF THE DRAWINGS

The same reference number represents the same element on all drawings.

FIG. 7 is a record layout for an extracted wireless broadband router data file in an example of the invention.

FIG. 8 is a record layout for a host file in an example of the invention.

FIG. 9 is a record layout for a customer hardware file in an example of the invention.

FIG. 10 is a record layout for a customer location file in an example of the invention.

FIG. 11 is a record layout for a customer file in an example of the invention.

FIG. 12 is a record layout of a spatial location file in an example of the invention.

FIG. 13 is a record layout of a grid table in an example of the invention.

FIG. 14 is a record layout of a sector name file in an example of the invention.

DETAILED DESCRIPTION OF THE PREFERRED EMBODIMENT

FIGS. 1-18 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
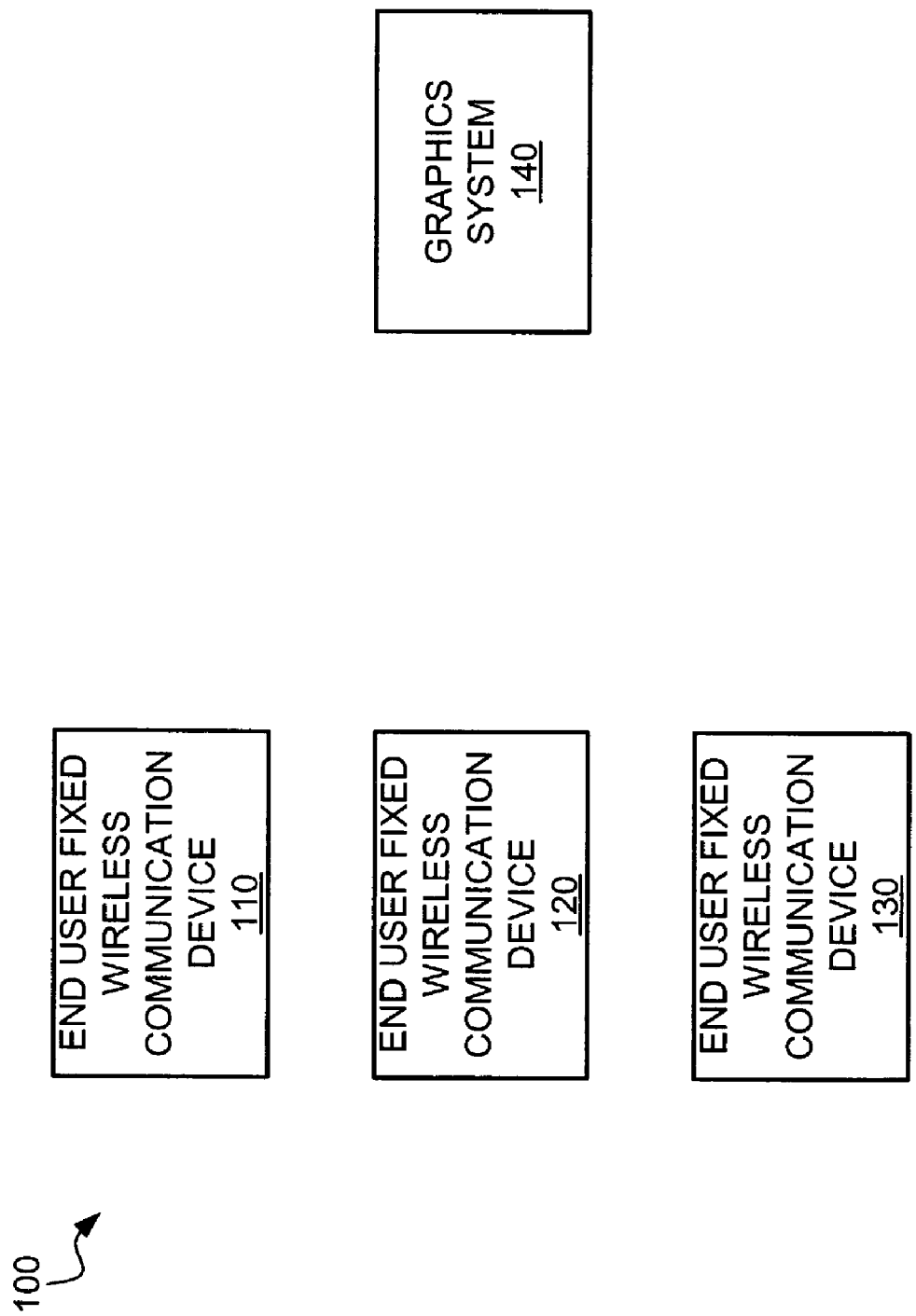
FIG. 1 is a block diagram of a wireless communication network in an example of the invention.
Figure 2:
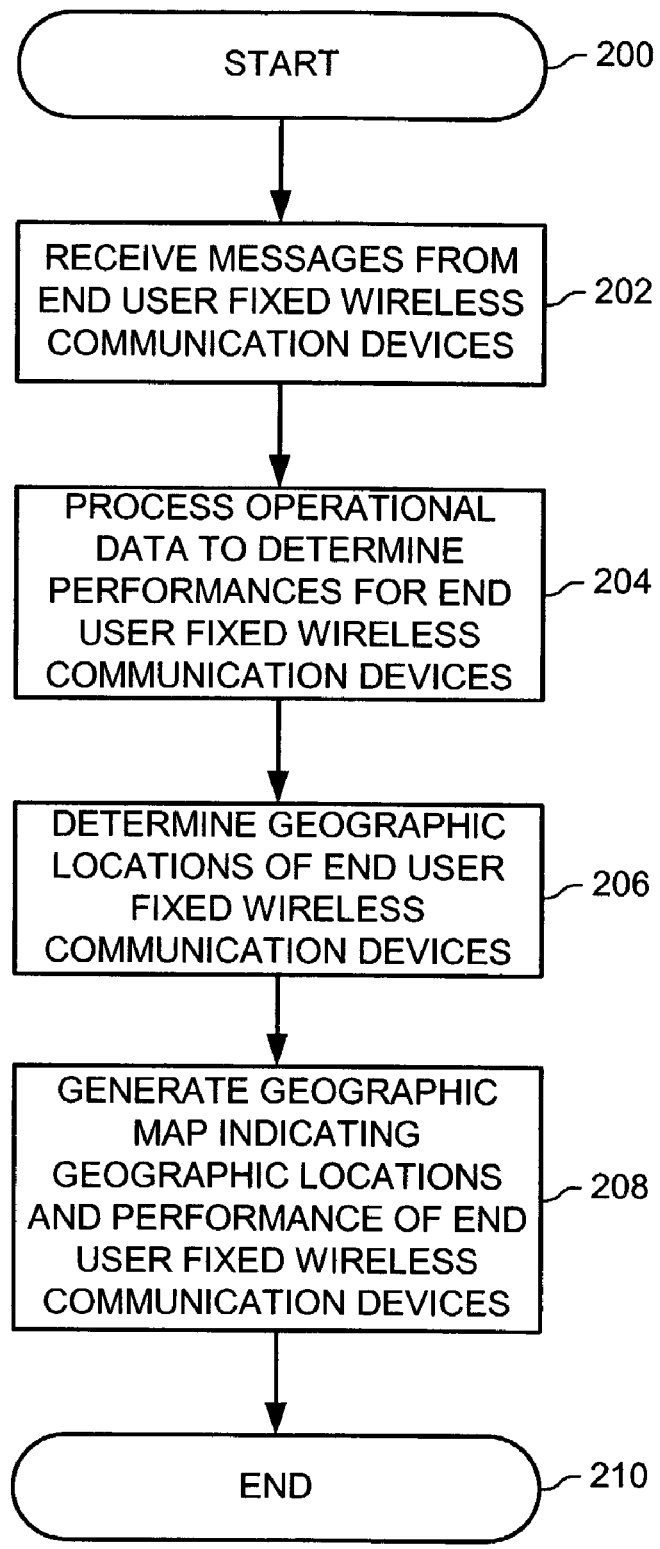
FIG. 2 is a flow chart of a graphics system in an example of the invention.

Wireless Communication Network with Geographic Map—FIGS. 1-2

FIG. 1 depicts a block diagram of a wireless communication network 100 in an example of the invention. The wireless communication network 100 includes an end user fixed wireless communication device 110, an end user fixed wireless communication device 120, an end user fixed wireless communication device 130, and a graphics system 140. The end user fixed wireless communication device 110, the end user fixed wireless communication device 120, and the end user fixed wireless communication device 130 are configured to communicate with graphics system 140 via wireless communications. In other embodiments, there are numerous end user fixed wireless communication devices 110, 120, and 130 but only three end user fixed wireless communication devices 110, 120, and 130 are depicted in FIG. 1 for the sake of simplicity.

The end user fixed wireless communication device 110, 120, and 130 comprises any end user device or equipment configured to perform wireless communications and transmit messages that indicate operational data. Fixed wireless communication are wireless communication with end user devices that do not move and are not mobile during normal operations. One example of the end user fixed wireless communication device 110, 120, and 130 is a wireless broadband router as described below in FIG. 3. Operational data is any data or information that indicate the operations of the end user fixed wireless communication devices 110, 120, and 130.

Figure 4:
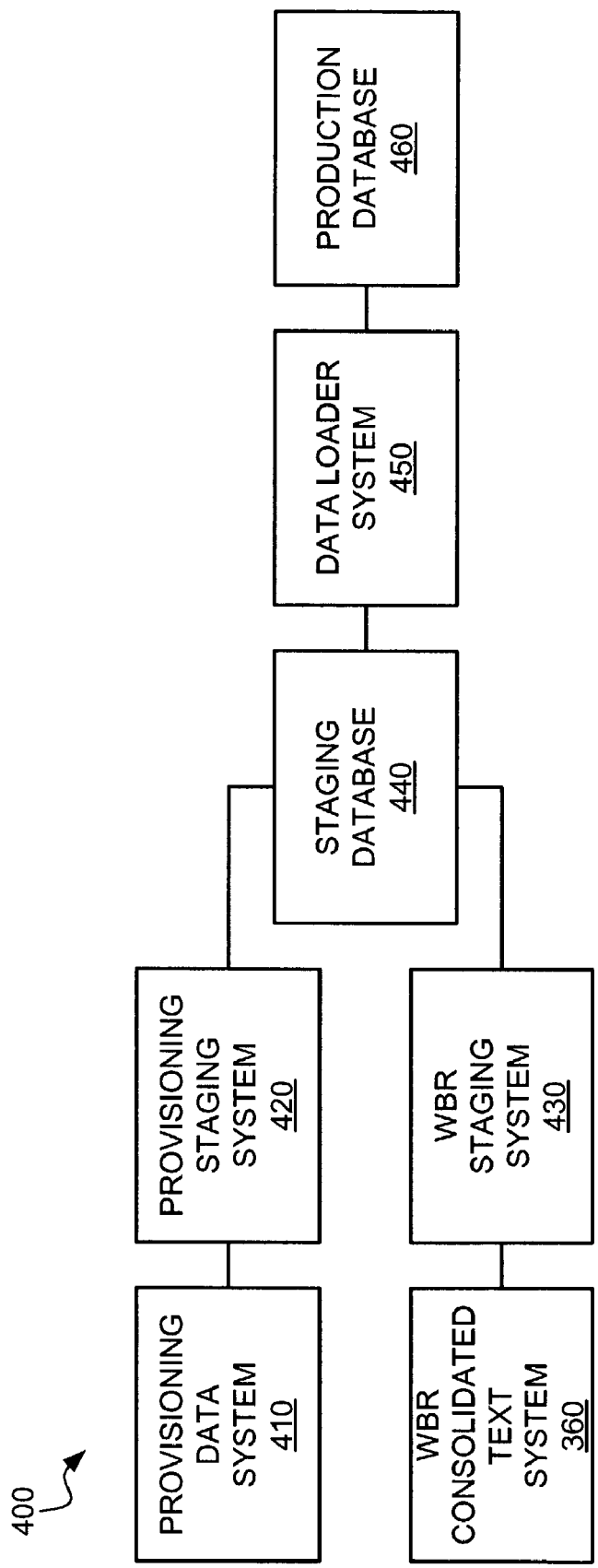
FIG. 4 is a block diagram of a communication network in an example of the invention.
Figure 5:
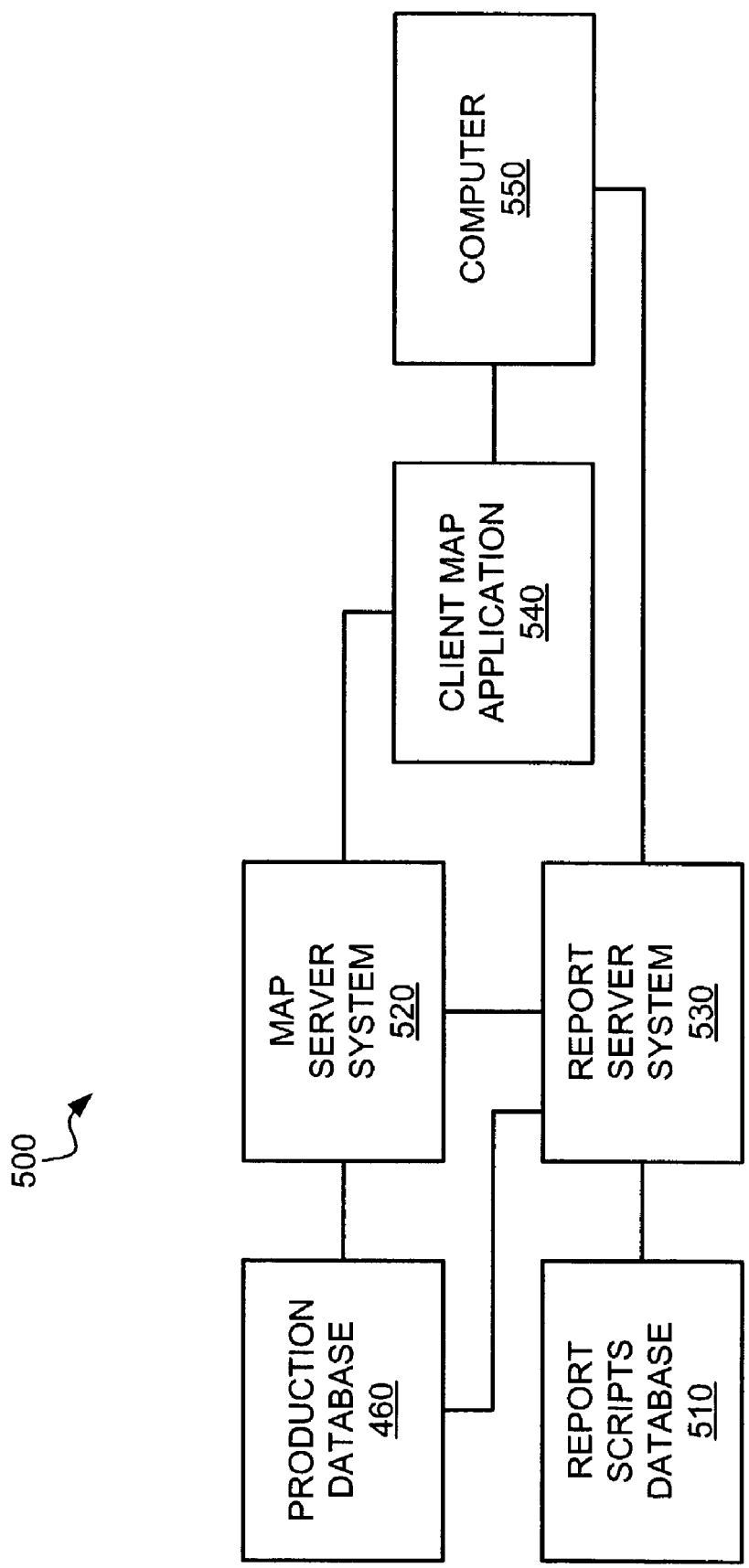
FIG. 5 is a block diagram of a communication network in an example of the invention.

The graphics system 140 is any system, device, or group of devices configured to (1) receive messages from the end user fixed wireless communication devices 110, 120, and 130 wherein the messages indicate operational data, (2) process the operational data to determine performances for the end user fixed wireless communication devices 110, 120 and 130 and diagnose provisionings of the end user fixed wireless communication devices 110, 120 and 130, (3) determine geographic locations of the end user fixed wireless communication devices 110, 120, and 130, and (4) generate a geographic map indicating the geographic locations and the performances of the end user fixed wireless communication devices. Performance is any indication, data or information related to how the end user fixed wireless communication devices 110, 120, and 130 are operating or functioning. Some examples of performances include power level, upload/download speeds, and upload/download bytes. Provisioning is any indication, data or information related to how the end user fixed wireless communication devices 110, 120, and 130 are provisioned, tuned, or calibrated. The geographic map is any visual representation of an area. In some embodiments, the geographic map is on-line, where a user may interact with the geographic map to perform functions such as zooming in or zooming out. In other embodiments, the geographic map is in a printed report format. One embodiment of the graphics system 140 that includes upstream managers, market system managers, performance management systems, and other systems in FIGS. 3, 4 and 5 is described below.

FIG. 2 depicts a flow chart of the graphics system 140 in an example of the invention. FIG. 2 begins in step 200. In step 202, the graphic system 140 receives messages from the end user fixed wireless communication devices 110, 120, and 130 wherein the messages indicate operational data. In step 204, the graphics system 140 processes the operational data to determine performances for the end user fixed wireless communication devices 110, 120, and 130. In step 206, the graphics system 140 determines geographic locations of the end user fixed wireless communication devices 110, 120, and 130. In step 208, the graphics system 140 generates a geographic map indicating the geographic locations and the performances of the end user fixed wireless communication devices 110, 120, and 130. FIG. 2 ends in step 210.

Wireless Communication Network with Wireless Broadband Router Map—FIGS. 3-18

Figure 3:
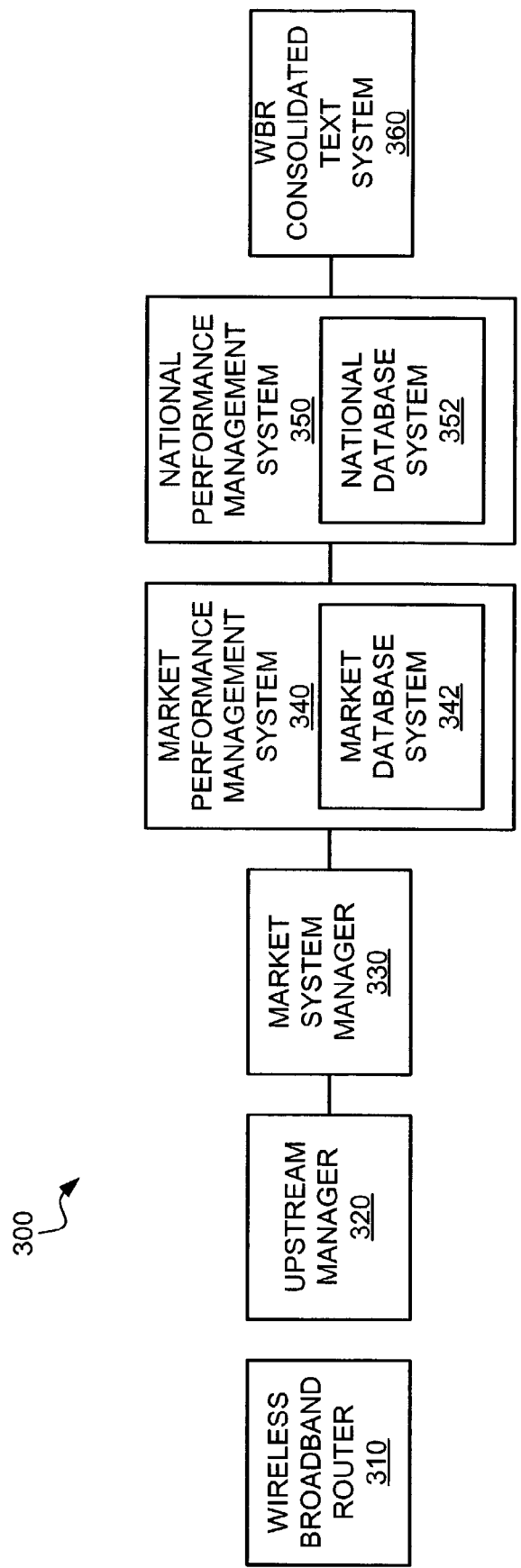
FIG. 3 is a block diagram of a wireless communication network in an example of the invention.

FIG. 3 depicts a block diagram of a wireless communication network 300 in an example of the invention. The wireless communication network 300 includes a wireless broadband router (WBR) 310, an upstream manager 320, a market system manager 330, a market performance management system 340, a national performance management system 350, and a WBR consolidated text system 360. The market performance management system 340 includes a market database system 342. The national performance management system 350 includes a national database system 352.

The wireless broadband router 310 is configured to communicate with upstream manager 320 using wireless communications. In one embodiment, the wireless communications are in the MMDS frequency range. The upstream manager 320 is connected to the market system manager 330. The market system manager 330 is connected to the market performance management system 340. The market performance management system 340 is connected to the national performance management system 350. The national performance management system 350 is connected to the WBR consolidated text system 360.

There are multiple systems such as multiple WBRs 310, upstream managers 320, market system manager 330, and market performance management systems 340 that are not shown for the sake of simplicity and brevity. The WBRs 310, upstream managers 320, market system manager 330, market performance management systems 340, and national performance management system 350 operates as described below in FIG. 6. The operation of the WBR consolidated text system 360 is described below in FIG. 6.

FIG. 4 depicts a block diagram of a communication network 400 in an example of the invention. The communication network 400 includes the WBR consolidated text system 360, a provisioning data system 410, a provisioning staging system 420, a WBR staging system 430, a staging database 440, a data loader system 450, and a production database 460. The provisioning data system 410 is connected to the provisioning staging system 420. The provisioning staging system 420 is connected to the staging database 440. The WBR consolidated text system 360 is connected to the WBR staging system 430. The WBR staging system 430 is connected to the staging database 440. The staging database 440 is connected to the data loader system 450. The data loader system 450 is connected to the production database 460. The operations of the WBR consolidated text system 360, a provisioning data system 410, a provisioning staging system 420, a WBR staging system 430, a staging database 440, a data loader system 450, and a production database 460 are described below in FIG. 6.

FIG. 5 depicts a block diagram of a communication network 500 in an example of the invention. The communication network 500 includes the production database 560, a reports scripts database 510, a map server system 520, a report server system 530, a client map application 540, and a computer 550. The production database 560 is connected to the map server system 520 and the report server system 530. The reports scripts database 510 is also connected to the report server system 530. The map server system 520 is connected to the client map application 540. The client map application 540 is connected to the computer 550. The report server system 530 is also connected to the computer 550.

Figure 6:
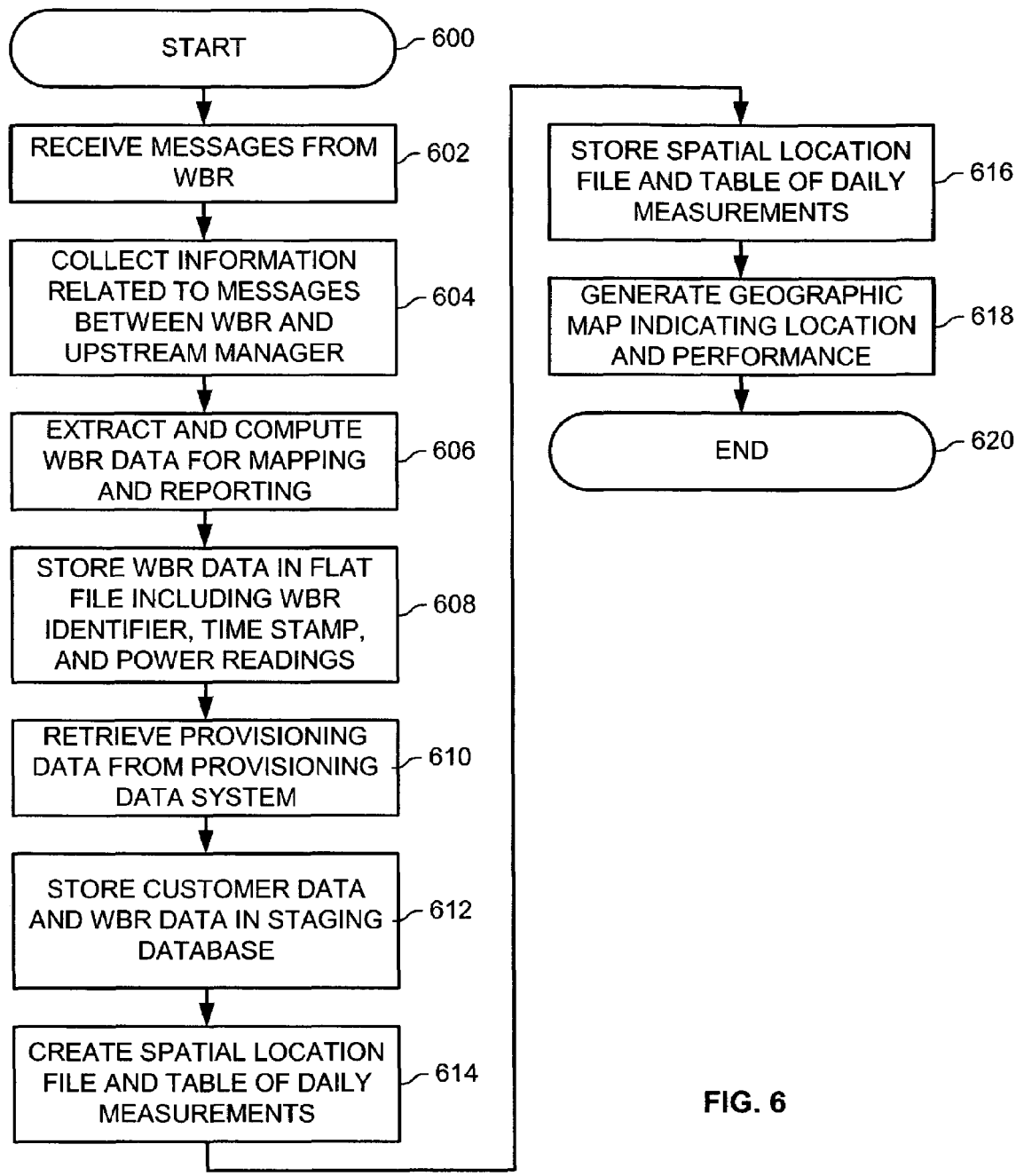
FIG. 6 is a flow chart for a wireless communication network in an example of the invention.

FIG. 6 depicts a flow chart for the wireless communication network 300 in an example of the invention. FIG. 6 begins in step 600. In step 602, the upstream manager 320 receives messages from the WBR 310 wherein the messages indicate operational data. Some examples of these messages are the user data, DONE messages, and other administrative or management signaling between the WBR 310 and the upstream manager 320. In some embodiments, the upstream manager 320 stores logs of these messages. In step 604, the market system manager 330, the market performance management system 340, and the national performance management system 350 collect information about the messages between the WBR 310 and the upstream manager 320. In some embodiments, the market system manager 330, the market performance management system 340, and the national performance management system 350 stores this information in memory or databases such as the market database system 342 and the national database system 352.

In step 606, the WBR consolidated text system 360 extracts and computes WBR data for mapping and reporting of the WBR data based on the information collected in step 604. In some embodiments, this extraction step occurs at a specified time each day. In step 608, the WBR consolidated text system 360 stores the WBR data in a flat file including WBR identifier, time/date stamp, and power readings. FIG. 7 depicts a record layout for an extracted WBR data in an example of the invention. The record layout for the extracted WBR data includes the fields of state, market, headend, integer, month, day, year, hostname, average power, and number of calibrations. The hostname is the identifier of the WBR 310. The average power is the average negotiated daily power per WBR for a specified period such as 24 hours. In other embodiments, the maximum and minimum power levels are also stored. The number of calibrations are the number of successful, requested power calibrations levels per WBR. In one embodiment, the state, market, headend, integer, month, day, and year are elements of a file name, while the hostname, average power, and number of calibrations are the fields in the file.

In step 610, the provisioning staging system 420 retrieves the provisioning data from the provisioning data system 410. The provisioning data is any data or information related to providing wireless communications to a customer such as customer, billing, and hardware information. Some examples of the provisioning data are discussed below in FIGS. 8, 9, 10 and 11. FIG. 8 depicts a record layout for a host file in an example of the invention. The host file includes the fields of host ID, host name, IP, market ID, and subdomain ID. FIG. 9 depicts a record layout for a customer hardware file in an example of the invention. This customer hardware file includes fields related to the hardware installed at the customer premises. The customer hardware file includes the fields of customer ID, UUID, CCMD Type ID, return device ID, DDFG ID, host ID, IP, UDFG ID, DHCP, ARP, VOL, and PFX.

FIG. 10 depicts a customer location file in an example of the invention. The customer location file includes fields related to the location of the customer. The customer location file includes the fields of customer ID, slatitude, slongitude, ssector, smiles, clatitude, clongitude, csector, and cmiles. FIG. 11 depicts a customer file in an example of the invention. The customer file includes fields related to the customer such as the address and billing information. The customer files includes the fields of customer ID—a unique identifier assigned to each customer, address1—the street and street number of the customer's location, address2—more detailed address information if needed, city, company name, division ID—division within a company, extension, customer's first name, franchise ID, day/month/year customer's WBR installed, line1—line number of first phone, line2—line number of second phone, customer's last name, market ID—unique identifier for a market, NPA1—area code of first phone, NPA2—area code of second phone, NXX1—exchange number of first phone, NXX2—exchange number of second phone, pager number, date on which WBR was provisioned, state, status ID—unique identifier specifying operational status of WBR, updated by, date/time on which record was updated last, zip code, install time when WBR was installed, NUM PCS—mobile PCS phone number of customer, new, CV, and VC.

In step 612, the provisioning staging database 420 stores the provisioning data in the staging database 440. The WBR staging system 430 also stores the WBR data in the staging database 440. In step 614, the data loader system 450 creates a spatial location file and a table of daily measurements based on the provisioning data and the WBR data. FIG. 12 depicts a record layout of a spatial location file in an example of the invention. The spatial location file uses a combination of selected fields from the provisioning data and the WBR data. The spatial location file includes the fields of host name, spatial location, slatitude—GPS measured latitude, slongitude—GPS measured longitude, clatitude—geocoded latitude, clongitude—geocoded longitude, address1—street address of WBR, city, state, zip code, date—date record updated, WBRAVG—average power level of WBR, WBRMAX—maximum power level of WBR, WBRMIN—minimum power level of WBR, NBRSCCSSFL—number of successful calibrations, IP—Internet protocol address, market ID—unique identifier of the market, customer ID, UUID—unique identifier of WBR, UDFG ID—unique identifier for the upstream data flow group, host ID—unique identifier of the host processor, ssector, csector, company name, first name, install day, install month, install year, last name, provision date, GPSSECTOR—sector in which GPS coordinates are located, GEOSECTOR—sector in which geocoordinates are located, MAXMINDIF—difference between maximum and minimum power level readings for one WBR, and SECTMATCH—flag indicating whether the GPS and geocoded sectors match. In one embodiment, the data loader system 450 determines spatial location from the slatitude and the slongitude fields. If no spatial location is determined, the data loader system 450 determines the spatial location from the clatitude and the clongitude fields. If still no spatial location is determined, the data loader system 450 determines the spatial location from the computation from the address 1, city, state, and zip code. In some embodiments, MapInfo is used to determine latitude and longitude from the customer address. The GEOSECTOR field is the spatial sector containing the WBR 310. The MAXMINDIF field is the difference between the WBRMAX and the WBRMIN. The NBRSCCSSFL field is the number of successful calibrations. The SECTMATCH field is a yes/no field to indicate whether the GISSECTOR and the GEOSECTOR fields match. The data loader system 450 also creates a grid table.

FIG. 13 depicts a record layout of the grid table in an example of the invention. The grid table includes the fields of description, column name, row name, market, grid cell, power average, and WBR count. FIG. 14 depicts a record layout of a sector name file in an example of the invention. The sector name file includes the fields of ID, market ID, UDFG ID, service area, UDFG name CMGR, GIS site, GIS sector, GIS site long, type, and status.

In step 614, the data loader system 450 stores the spatial location file and the tables of daily measurements in the production database 460. In this embodiment, the production database 460 is an Oracle Spatial database. In step 616, the map server system 520 generates a geographic map indicating the locations and the performances of the WBRs based on the data from the production database 460. The map server system 520 then displays the geographic map on in the client map application that is being executed by the computer 550. In some embodiments, AutoDesk from MapGuide is used for on-line map presentation. In some embodiments, the map server system 520 receives and processes requests from the client map application 540 and the computer 550. The requests is any message, information, or signaling that indicates control of the geographic map. Some requests may be to zoom in, zoom out, or move the center of the map. Other examples of requests are a request for an on-line map or a report. Another example of a request is a request for performance information related to the WBR 310. The map server system 520 transfer the requests for reports to the report server system 530. The report server system 530 processes the requests and retrieves spatial location files and the tables of daily measurements from the production database 460. The report server system 530 also retrieves report scripts from the reports script database 510. The report server system 530 generates on-line or printed reports for the computer 550 based on the requests and the data from the production database 460 and the reports scripts database 510.

Figure 15:
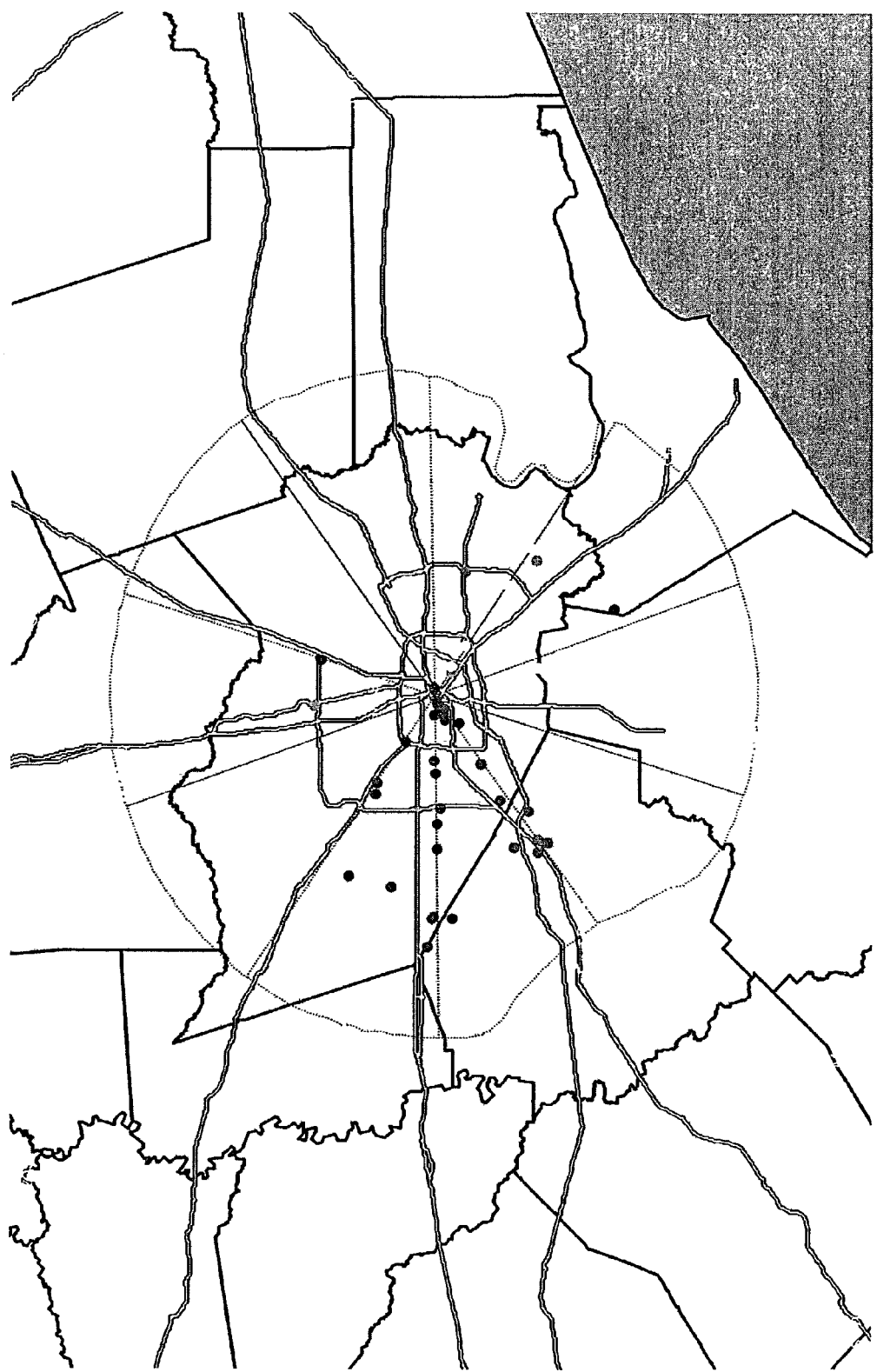
FIG. 15 is an illustration of a geographic map for out of sector wireless broadband routers in an example of the invention.
Figure 16:
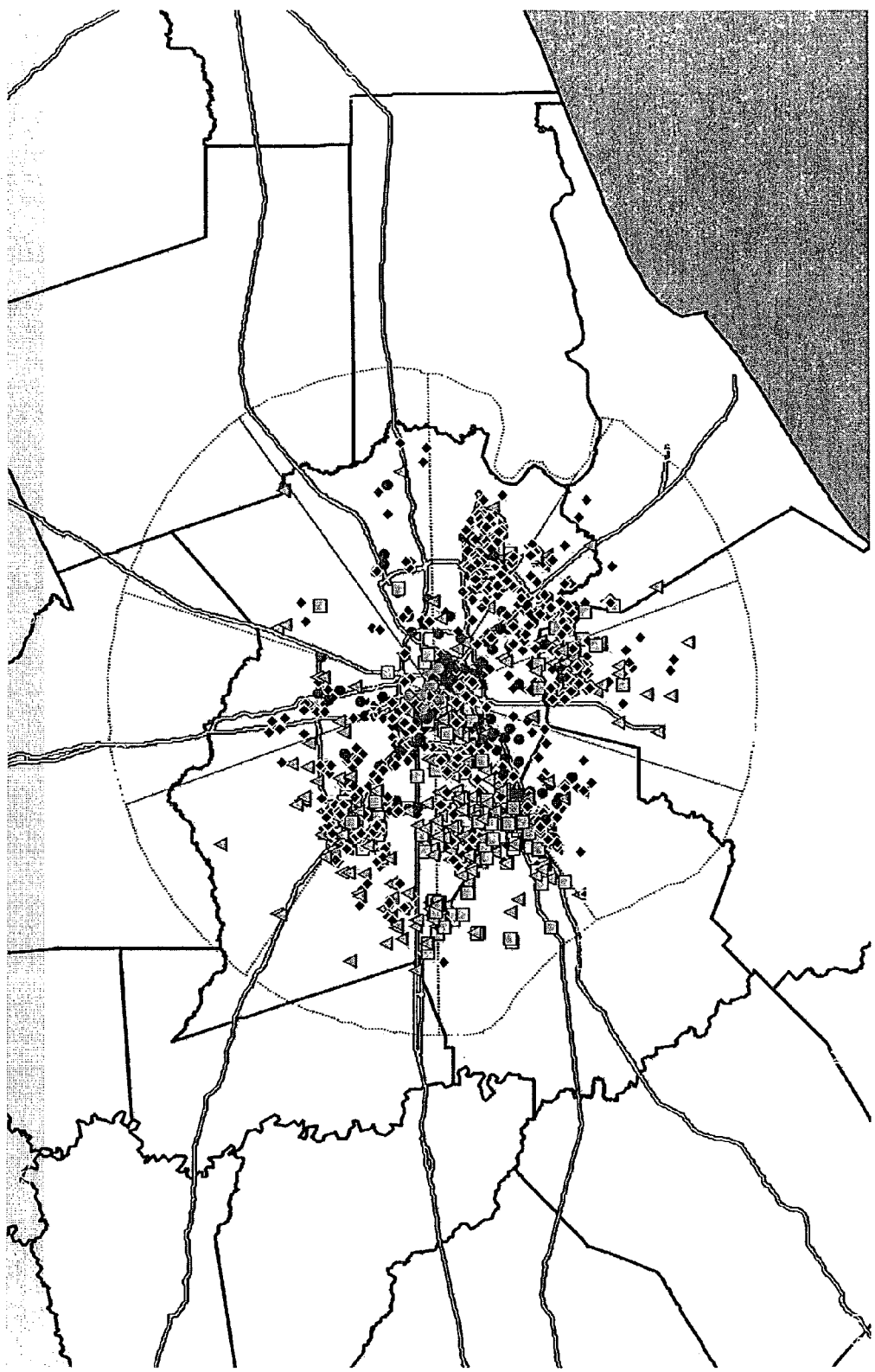
FIG. 16 is an illustration of a geographic map for power levels of wireless broadband routers in an example of the invention.
Figure 17:
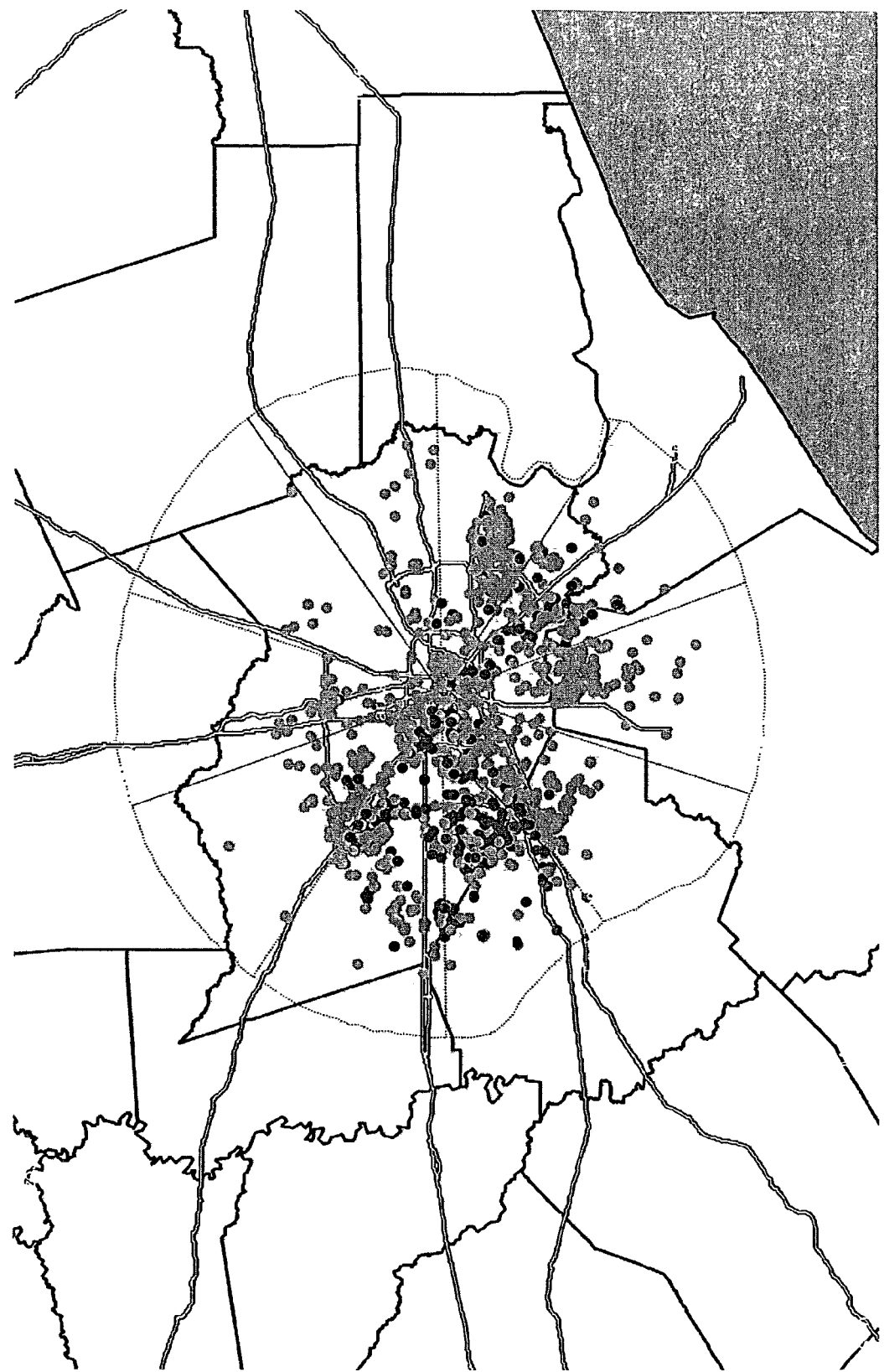
FIG. 17 is an illustration of a geographic map for calibration counts in an example of the invention.

There are numerous variations in displaying a geographic map. FIG. 15 depicts an illustration of a geographic map for out of sector WBRs in an example of the invention. The illustration in FIG. 15 only shows which WBRs 310 are misprovisioned in the wrong sector. In other embodiments, a report is generated that show which WBRs are misprovisioned. FIG. 16 depicts an illustration of a geographic map for power levels of WBRs in an example of the invention. The illustration in FIG. 16 shows how each WBR is represented by a certain color, size, and/or shape such as a triangle, square, circle or diamond. In this embodiment, the dotted lines also illustrate the sector in wireless service is provided and the Regional Service Area, which defines the legal boundary in which service can be provided. In FIG. 16, each variation in color or shape represents a power level of each WBR 310. In another embodiment, a grid cell such as a sector has a color that represents an average power level of the sector. Also, each WBR 310 is located on the geographic map based on the spatial location. Thus, areas that need reduction or increased power levels may advantageously be identified to improve service levels. FIG. 17 depicts an illustration of a geographic map for calibration counts in an example of the invention.

Figure 18:
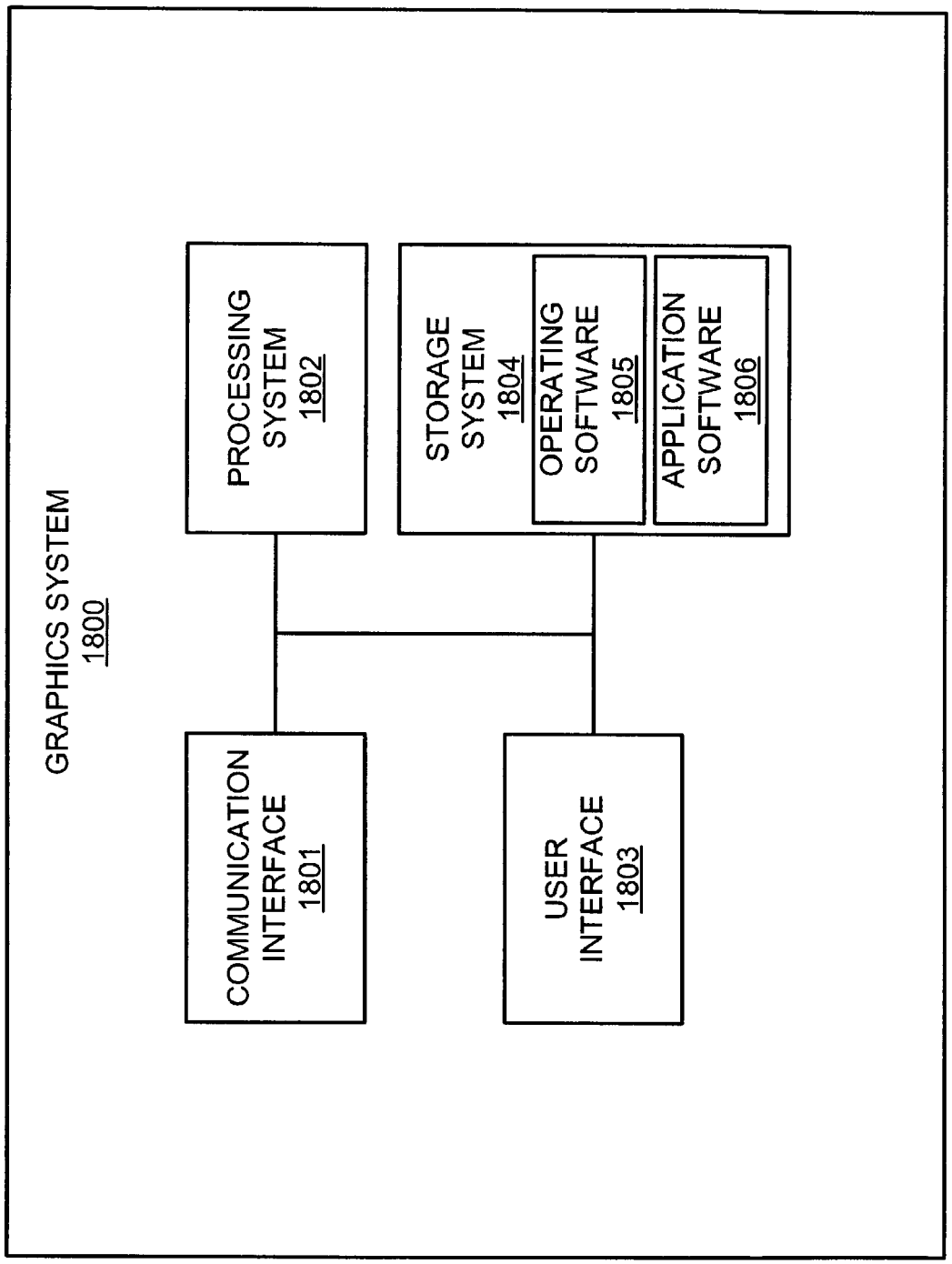
FIG. 18 is a block diagram of a graphics system in an example of the invention.

FIG. 18 depicts block diagram of a graphics system 1800 in an example of the invention. In some embodiments, a graphics system 1800 performs the above-described functions to operate in accord with the invention. Graphics system 1800 includes communication interface 1801, processing system 1802, user interface 1803, and storage system 1804. Storage system 1804 stores operating software 1805, and application software 1806. Processing system 1802 is linked to communication interface 1801, user interface 1803, and storage system 1804. Graphics system 1800 could be comprised of a programmed general-purpose computer, although those skilled in the art will appreciate that programmable or special purpose circuitry and equipment may be used. Graphics system 1800 may use a client server architecture where operations are distributed among a server system and client devices that together comprise elements 1801-1806.

Communication interface 1801 could comprise a network interface card, modem, port, or some other communication device. Communication interface 1801 may be distributed among multiple communication devices. Processing system 1802 could comprise a computer microprocessor, logic circuit, or some other processing device. Processing system 1802 may be distributed among multiple processing devices. User interface 1803 could comprise a keyboard, mouse, voice recognition interface, microphone and speakers, graphical display, touch screen, or some other type of user device. Storage system 1804 could comprise a disk, tape, integrated circuit, server, or some other memory device. Storage system 1804 may be distributed among multiple memory devices.

Processing system 1802 retrieves and executes operating software 1805 and application software 1806 from storage system 1804. Operating software 1805 may comprise an operating system, utilities, drivers, networking software, and other software typically loaded onto a general-purpose computer. Application software 1806 could comprise an application program, firmware, or some other form of machine-readable processing instructions. When executed by processing system 1802, application software 1806 directs processing system 1802 to operate in accord with the invention as described above.

The invention claimed is:

1. A method of graphically representing a plurality of end user fixed wireless communication devices, the method comprising receiving messages from the end user fixed wireless communication devices wherein the messages indicate operational data;

in a processor, processing the operational data to determine performances for the end user fixed wireless communication devices and diagnose provisionings of the end user fixed wireless communication devices, wherein the performances comprise power levels and calibration counts of the end user fixed wireless communication devices;

determining geographic locations of the end user fixed wireless communication devices; and generating a geographic map indicating the geographic locations and the performances of the end user fixed wireless communication devices.

2. The method of claim 1 wherein the end user fixed wireless communication device is a wireless broadband router.

3. The method of claim 1 wherein sizes of the end user fixed wireless communication devices on the geographic map indicate the performances of the end user fixed wireless communication devices.

4. The method of claim 1 wherein shapes of the end user fixed wireless communication devices on the geographic map indicate the performances of the end user fixed wireless communication devices.

5. The method of claim 1 wherein colors of the end user fixed wireless communication devices on the geographic map indicate the performances of the end user fixed wireless communication devices.

6. The method of claim 1 wherein colors of a geographic area on the geographic map indicate the performances of the end user fixed wireless communication devices.

7. The method of claim 1 further comprising:
receiving and processing a request for selecting one or more of the end user fixed wireless communication devices; and
displaying the performances of the selected one or more of the end user fixed wireless communication devices.

8. The method of claim 1 further comprising displaying a geographic map indicating the geographic locations and the performances of the end user fixed wireless communication devices.

9. The method of claim 1 further comprising printing a geographic map indicating the geographic locations and the performances of the end user fixed wireless communication devices.

10. The method of claim 1 further comprising:
in the processor, determining whether one of the end user fixed wireless communication devices is misprovisioned; and
indicating the misprovisioned one of the end user fixed wireless communication devices on the geographic map.

11. The method of claim 1 wherein determining the geographic locations of the end user fixed wireless communication devices comprises determining a latitude and a longitude of each of the end user fixed wireless communication devices.

12. The method of claim 1 further comprising retrieving provisioning information related to the provisioning of the end user fixed wireless communication devices.

13. The method of claim 12 wherein the provisioning information comprises customer information.

14. The method of claim 12 wherein the provisioning information comprises hardware information.

15. A computer-readable medium comprising software for graphically representing a plurality of end user fixed wireless communication devices, the software comprising:
instructions operational when executed by a processor to direct the processor to receive messages from the end user fixed wireless communication devices wherein the messages indicate operational data, process the operational data to determine performances for the end user fixed wireless communication devices and diagnose provisionings of the end user fixed wireless communication devices, wherein the performances comprise power levels and calibration counts of the end user fixed wireless communication devices, determine geographic locations of the end user fixed wireless communication devices, and generate a geographic map indicating the geographic locations and the performances of the end user fixed wireless communication devices.

16. The computer-readable medium of claim 15 wherein the end user fixed wireless communication device is a wireless broadband router.

17. The computer-readable medium of claim 15 wherein sizes of the end user fixed wireless communication devices on the geographic map indicate the performances of the end user fixed wireless communication devices.

18. The computer-readable medium of claim 15 wherein shapes of the end user fixed wireless communication devices on the geographic map indicate the performances of the end user fixed wireless communication devices.

19. The computer-readable medium of claim 15 wherein colors of the end user fixed wireless communication devices on the geographic map indicate the performances of the end user fixed wireless communication devices.

20. The computer-readable medium of claim 15 wherein colors of a geographic area on the geographic map indicate the performances of the end user fixed wireless communication devices.

21. The computer-readable medium of claim 15 wherein the instructions are operational when executed by the processor to direct the processor to receive and process a request for selecting one or more of the end user fixed wireless communication devices and display the performances of the selected one or more of the end user fixed wireless communication devices.

22. The computer-readable medium of claim 15 wherein the instructions are operational when executed by the processor to direct the processor to display a geographic map indicating the geographic locations and the performances of the end user fixed wireless communication devices.

23. The computer-readable medium of claim 15 wherein the instructions are operational when executed by the processor to direct the processor to print a geographic map indicating the geographic locations and the performances of the end user fixed wireless communication devices.

24. The computer-readable medium of claim 15 wherein the instructions are operational when executed by the processor to direct the processor to determine whether one of the end user fixed wireless communication devices is misprovisioned and indicate the misprovisioned one of the end user fixed wireless communication devices on the geographic map.

25. The computer-readable medium of claim 15 wherein the instructions are operational when executed by the processor to direct the processor to determine a latitude and a longitude of each of the end user fixed wireless communication devices.

26. The computer-readable medium of claim 15 wherein the instructions are operational when executed by the processor to direct the processor to retrieve provisioning information related to the provisioning of the end user fixed wireless communication devices.

27. The computer-readable medium of claim 26 wherein the provisioning information comprises customer information.

28. The computer-readable medium of claim 26 wherein the provisioning information comprises hardware information.

29. A system for graphically representing a plurality of end user fixed wireless communication devices, the system comprising:
an interface configured to receive messages from the end user fixed wireless communication devices wherein the messages indicate operational data; and
a processor connected to the interface and configured to process the operational data to determine performances for the end user fixed wireless communication devices and diagnose provisionings of the end user fixed wireless communication devices, wherein the performances comprise power levels and calibration counts of the end user fixed wireless communication devices, determine geographic locations of the end user fixed wireless communication devices, and generate a geographic map indicating the geographic locations and the performances of the end user fixed wireless communication devices.

30. The system of claim 29 wherein the end user fixed wireless communication device is a wireless broadband router.

31. The system of claim 29 wherein sizes of the end user fixed wireless communication devices on the geographic map indicate the performances of the end user fixed wireless communication devices.

32. The system of claim 29 wherein shapes of the end user fixed wireless communication devices on the geographic map indicate the performances of the end user fixed wireless communication devices.

33. The system of claim 29 wherein colors of the end user fixed wireless communication devices on the geographic map indicate the performances of the end user fixed wireless communication devices.

34. The system of claim 29 wherein colors of a geographic area on the geographic map indicate the performances of the end user fixed wireless communication devices.

35. The system of claim 29 wherein the processor is configured to receive and process a request for selecting one or more of the end user fixed wireless communication devices and display the performances of the selected one or more of the end user fixed wireless communication devices.

36. The system of claim 29 wherein the processor is configured to display a geographic map indicating the geographic locations and the performances of the end user fixed wireless communication devices.

37. The system of claim 29 wherein the processor is configured to print a geographic map indicating the geographic locations and the performances of the end user fixed wireless communication devices.

38. The system of claim 29 wherein the processor is configured to determine whether one of the end user fixed wireless communication devices is misprovisioned and indicate the misprovisioned one of the end user fixed wireless communication devices on the geographic map.

39. The system of claim 29 wherein the processor is configured to determine a latitude and a longitude of each of the end user fixed wireless communication devices.

40. The system of claim 29 wherein the processor is configured to retrieve provisioning information related to provisioning of the end user fixed wireless communication devices.

41. The system of claim 40 wherein the provisioning information comprises customer information.

42. The system of claim 40 wherein the provisioning information comprises hardware information.

* * * * *